US011526528B2

(12) United States Patent
Ke et al.

(10) Patent No.: US 11,526,528 B2
(45) Date of Patent: Dec. 13, 2022

(54) TECHNIQUES AND ARCHITECTURES FOR PROVIDING ATOMIC TRANSACTIONS ACROSS MULTIPLE DATA SOURCES

(71) Applicant: salesforce.com, inc., San Francisco, CA (US)

(72) Inventors: Zhidong Ke, Milpitas, CA (US); Kevin Terusaki, Palo Alto, CA (US); Yifeng Liu, Palo Alto, CA (US); Utsavi Benani, Fremont, CA (US); Heng Zhang, San Jose, CA (US)

(73) Assignee: salesforce.com, inc., San Francisco, CA (US)

( * ) Notice: Subject to any disclaimer, the term of this patent is extended or adjusted under 35 U.S.C. 154(b) by 167 days.

(21) Appl. No.: 16/922,989

(22) Filed: Jul. 7, 2020

(65) Prior Publication Data

US 2022/0012259 A1 Jan. 13, 2022

(51) Int. Cl.
*G06F 16/20* (2019.01)
*G06F 16/25* (2019.01)
*G06F 16/23* (2019.01)

(52) U.S. Cl.
CPC ........ *G06F 16/254* (2019.01); *G06F 16/2379* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

Notice of Allowance dated Dec. 24, 2021 for U.S. Appl. No. 16/943,314 (pp. 1-9).

(Continued)

*Primary Examiner* — Jau Shya Meng
(74) *Attorney, Agent, or Firm* — Kwan & Olynick LLP

(57) ABSTRACT

Techniques and mechanisms for ingesting data through an atomic transaction are disclosed. Raw data is received from multiple disparate sources to be consumed in an environment that does not support atomic write operations to data consumers. The environment has at least a data table and a notification table. A write to an entry in the data table having an associated version is attempted. The data table entry corresponds to the data to be consumed. A write to a corresponding entry to the notification table is attempted in response to a successful write attempt to the data table. The notification table entry includes information about the corresponding data table entry. The version associated with the data table is modified in response to successful writes of both the data table entry and the notification table entry. At least one data consumer is notified that the data table version has been modified.

20 Claims, 6 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,418,435 B1* | 8/2008 | Sedlar ................. G06F 21/6218 |
| 7,620,655 B2 | 11/2009 | Larsson et al. |
| 8,504,513 B2 | 8/2013 | Aski |
| 10,120,845 B1 | 11/2018 | Palm |
| 10,311,079 B1 | 6/2019 | Sylvester |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2011/0191303 A1 | 8/2011 | Kaufman |
| 2017/0017514 A1 | 1/2017 | Zhang |
| 2017/0124170 A1 | 5/2017 | Koorapati |
| 2017/0286526 A1* | 10/2017 | Bar-Or ................. G06F 16/288 |
| 2018/0096001 A1 | 4/2018 | Soza |
| 2019/0026185 A1 | 1/2019 | Raja |
| 2019/0042615 A1 | 2/2019 | Wang |
| 2019/0146978 A1* | 5/2019 | Beedgen ............. G06F 16/258 707/754 |
| 2019/0370599 A1 | 12/2019 | Rajmohan |
| 2020/0334240 A1 | 10/2020 | Muralidhar |
| 2021/0383370 A1 | 12/2021 | Tippets |

OTHER PUBLICATIONS

Notice of Allowance dated Dec. 29, 2021 for U.S. Appl. No. 16/943,314 (pp. 1-10).

Notice of Allowance for U.S. Appl. No. 13/841,713 dated Sep. 25, 2015, 25 pages.

Office Action (Non-Final Rejection) dated Feb. 17, 2022 for U.S. Appl. No. 16/922,986 (pp. 1-52).

Office Action dated Feb. 8, 2022 for U.S. Appl. No. 17/156,442 (pp. 1-13).

Office Action dated May 31, 2022 for U.S. Appl. No. 17/156,442 (pp. 1-13).

* cited by examiner

TECHNIQUES AND ARCHITECTURES FOR PROVIDING ATOMIC TRANSACTIONS ACROSS MULTIPLE DATA SOURCES

TECHNICAL FIELD

Embodiments relate to techniques for managing data traffic in environments not providing native atomic transactions to provide, for example, atomic data ingestion. More particularly, embodiments relate to techniques for managing data traffic in environments not providing native atomic transactions by, for example, utilizing two or more coordinated data tables.

BACKGROUND

A "data lake" is a collection data from multiple sources and is not stored in a standardized format. Because of this, collection of the data in the data lake is not as systematic and predictable as more structured collections of data. Thus, many of the tools that are utilized to ingest data into a data lake (or other data collection structures) do not (or cannot) provide atomic writes to the final data source.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

In general, a data lake is a data repository that stores data in its native format until the data is needed. Typically, these data repositories are very large and ingest constant (or near constant) data streams for multiple sources. The term "data lake" refers to the strategy of gathering large amounts of natively-formatted data and not to any particular mechanisms for maintaining the repository. Thus, the mechanisms described herein are described as certain embodiments with respect to various components and data flow elements; however, the techniques are more broadly applicable and could be used with other components or in other environments.

Some data lake implementations are based on Apache Hadoop, which provides various software utilities that provide distributed processing of large data sets across multiple computing devices. Other data lake implementations can be based on Apache Spark, which provides a framework for real time data analytics using distributed computing resources. Other platforms and mechanisms can be utilized to manage data lakes (or other large collections of data).

Figure 1:
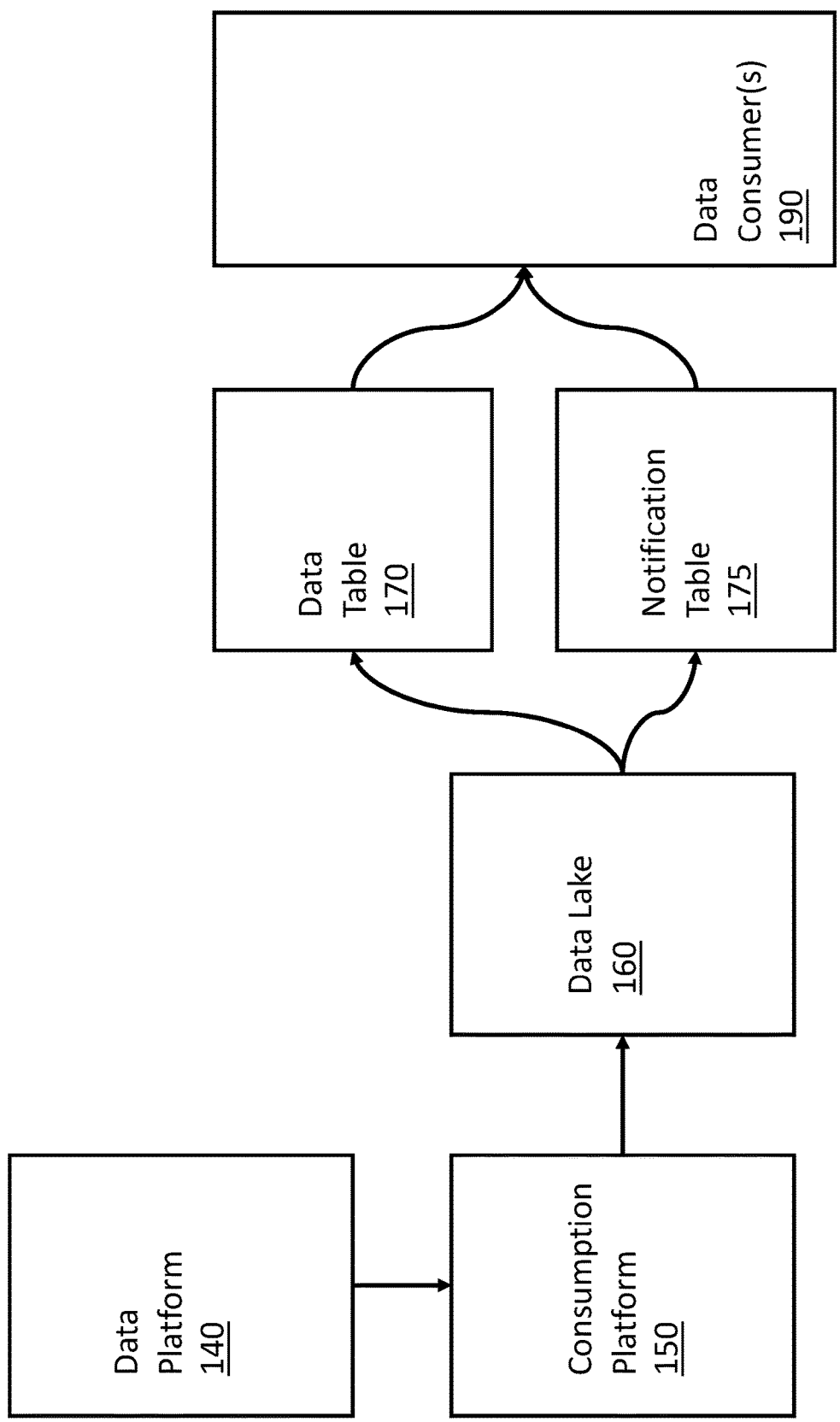
FIG. 1 is a block diagram of an architecture to provide atomic transactions across multiple data sources.

FIG. 1 is a block diagram of an architecture to provide atomic transactions across multiple data sources. The block diagram of FIG. 1 provides an ingestion mechanism that can be utilized to provide data to a data lake (or other collection of data). The mechanism of FIG. 1 provides a level of atomicity for ingestions transactions for a data lake or similar data repository.

Data platform 140 can provide a structure for handling large data loads. For example, in some embodiments, data platform 140 can be provided utilizing Apache Kafka (or similar architecture). Apache Kafka is an open source platform available from Apache Software Foundation based in Wakefield, Mass., USA. Other stream processing and/or message broker platforms can be utilized in different embodiments.

Continuing with the Kafka example, Kafka provides a unified, high-throughput, low-latency platform for handling real-time data feeds. Kafka is based on a commit log concept and allows data consumers to subscribe to data feeds to be utilized by the consumer, and can support real-time applications. In operation, Kafka stores key-value messages from any number of producers, and the data can be partitioned into topic partitions that are independently ordered. Consumers can read messages from subscribed topics.

Data platform 140 functions to gather various types of raw data from any number of data sources (not illustrated in FIG. 1). These data sources can include, for example, data received via graphical user interfaces (GUIs), location data (e.g., global positioning system (GPS) data), biometric data, etc. Any type of data from any number of disparate data sources can provide data to be gathered via data platform 140.

Consumption platform 150 can provide a mechanism to consume data from data platform 140 and manage ingestion of the data to data lake 160. In some embodiments, consumption platform 150 is a distributed cluster-computing framework that can provide data parallelism and fault tolerance. For example, in some embodiments, consumption platform 150 can be provided utilizing Apache Spark (or similar architecture). Apache Spark is an open source platform available from Apache Software Foundation based in Wakefield, Mass., USA. Other consumption platforms and/ or data management mechanisms can be utilized in different embodiments.

Continuing with the Spark example, Spark provides an open source distributed general purpose cluster computing framework with an interface for programming clusters with parallelism and fault tolerance. Spark can be used for streaming of data from data platform 140 to data lake 160. Thus, in various embodiments, large numbers of parallel Spark jobs can be utilized to ingest data to data lake 160.

Data lake 160 functions to store data acquired via data platform 140 and managed/routed by consumption platform 150. As described in greater detail below, the processing pipeline for data lake 160 can provide atomic transactions across multiple data sources. In various embodiments, data ingestion can be provided by parallel streaming jobs (e.g., Spark streaming jobs) that can function to consume data in real time (or near real time) and write the data to two data sources (e.g., data table 170 and notification table 175) in a single transaction. Any number of similar parallel structures can be supported. This can provide atomic transactions between data lake 160 and data consumers 190

In one embodiment, in order to provide this single transaction as an atomic transaction, the following four scenarios are supported: 1) writes to both data table 170 and notification table 175 are successful; 2) the write to data table 170 is successful and the write to notification table 175 is unsuccessful; 3) the write to data table 170 is unsuccessful an the write to notification table 175 is successful; and 4) the writes to both data table 170 and notification table 175 are unsuccessful.

In a Spark-based embodiment, for example, the open source Delta application program interface (API) can be utilized to provide a version for a given operation. In some embodiments (also Spark-based) the foreachBatch API can be utilized to group writes into batch operations. In alternate embodiments, other APIs/interfaces can be utilized to provide similar functionality. In some embodiments, the write to data table 170 is attempted before the write to notification table 175.

In general, data consumer(s) 190 is/are notified that data is available after both data table 170 and notification table 175 are written to successfully. Data consumer(s) 190 can be any type of data consumer, for example, analytics platforms, data warehouses, artificial intelligence (AI) platforms, etc.

Thus, the architecture of FIG. 1 can provide gathering/ingestion of various types of data from any number of supported data sources utilizing data table-notification table pairs to support atomic transactions from the various data sources to one or more data consumers (190).

Figure 2:
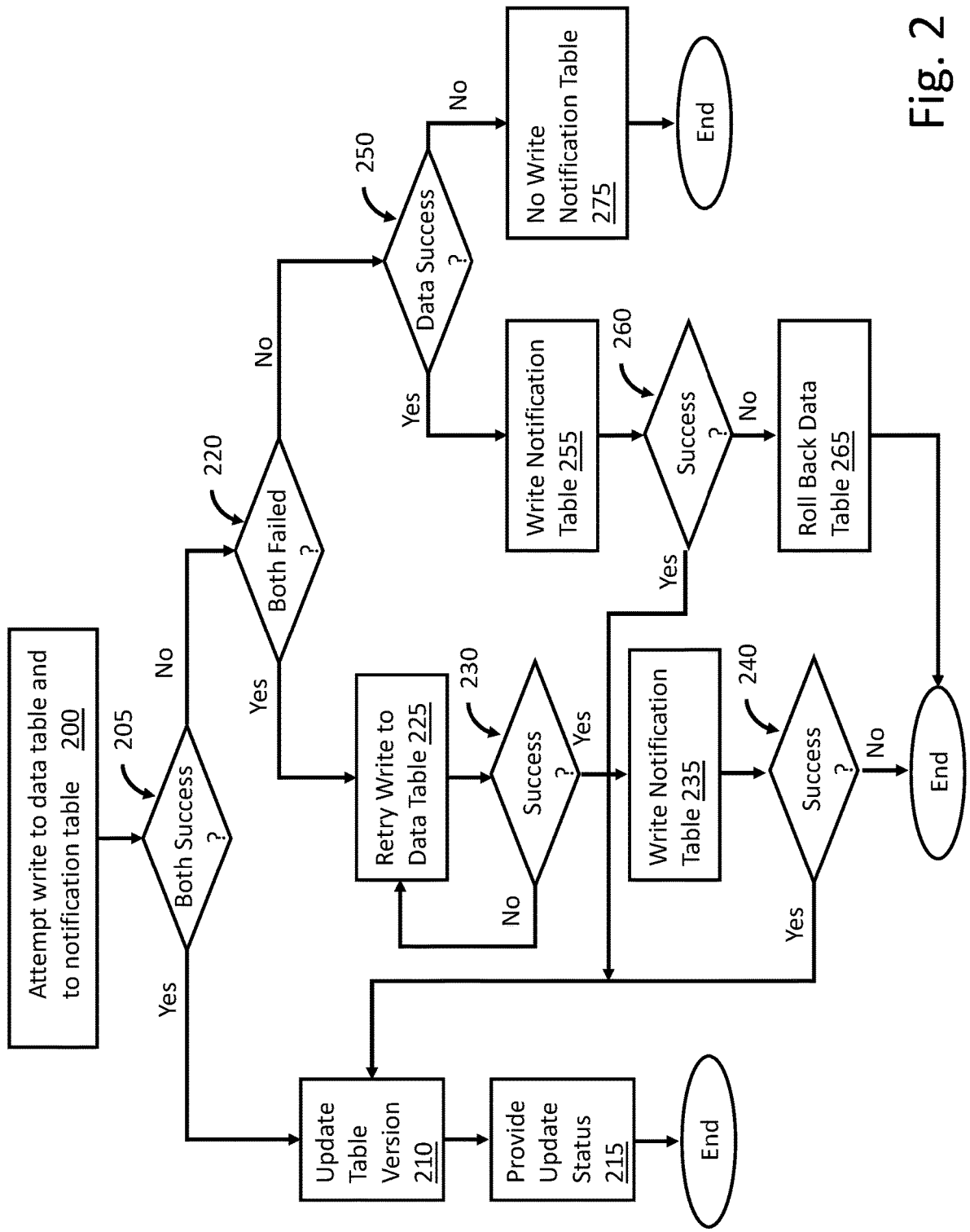
FIG. 2 is a flow diagram of an example embodiment of a technique to provide atomic transactions across multiple data sources.

FIG. 2 is a flow diagram of an example embodiment of a technique to provide atomic transactions across multiple data sources. The flow illustrated in FIG. 2 can be provided within the context of the architecture of FIG. 1. As discussed above, parallel streaming jobs can be utilized to write to a data table and a notification table in parallel in order to provide an atomic data transaction to a data consumer.

As described above, this can be accomplished utilizing Apache Kafka and Apache Spark. In alternate embodiments, other specific mechanisms for gathering and ingesting data can be utilized to perform the functionality described with respect to FIG. 2.

The streaming job(s) attempt to write both to the data table (e.g., 170) and to the notification table (e.g., 175), 200. As discussed above, this can be accomplished via a Spark job or similar mechanism. If the write to the data table and the write to the notification table are successful, 205, then the data table version is updated, 210 and a status update or notification can be provided, 215, to allow one or more downstream data consumers to be informed of the successful writes.

If both the write to the data table and the write to the notification table are not successful, 205, because both the write to the data table and the write to the notification table have failed, 220, then the write to the data table is retried a pre-selected (e.g., 2, 10, 14, 37) number of times, 225. If one of the retries is successful, 230, then another attempt can be made to write the notification table, 235. If the write to the notification table is successful, 240, then the data table version is updated, 210 and a status update or notification can be provided, 215, to allow one or more downstream data consumers to be informed of the successful writes. If the write to the notification table is not successful, 240, then the process can end.

If both the write to the data table and the write to the notification table are not successful, 205, because one of the write to the data table and the write to the notification table have failed, 220, then if the write to the data table was successful, 250, the write to the notification table is retried, 255. In some embodiments, a pre-selected number of retries can be attempted before determining success or failure (e.g., 260). If the retried write to the notification table is successful, 260, then the data table version is updated, 210 and a status update or notification can be provided, 215, to allow one or more downstream data consumers to be informed of the successful writes. If the retried write to the notification table is not successful, 260, then the data table can be rolled back, 265, and the process can end.

If both the write to the data table and the write to the notification table are not successful, 205, because one of the write to the data table and the write to the notification table have failed, 220, then if the write to the data table was not successful, 250, there is no write to the notification table, 275. The process can then end.

In summary, if writes to both the data table and notification table are successful, the version of the data table is increased and the downstream data consumer(s) is/are notified via an update to the notification table. If writes to both the data table and the notification table both fail, the write to the data table can be retried because the data table write is attempted prior to the notification table write. If, after a pre-selected number of retries the write to the data table still fails the atomic transaction can be terminated and no writes occur to either the data table or the notification table for the current transaction. The table versions will be unchanged so the downstream consumers will have no indication of new data.

In some embodiments, if the write to the data table is successful and the write to the notification table fails, the version of the data table is increased but the data table is rolled back to its previous state because the atomic transaction cannot be completed due to the failure of the write to the notification table. No downstream consumer notification is provided. If the write to the data table fails and the write to the notification table succeeds (or could succeed), the version of the data table is not increased and the data is not written to the notification table. No downstream consumer notification is provided.

Thus, only when the writes to both the data table and the notification table are successful will the downstream data consumer be notified of the newly available data. Otherwise, the downstream data consumer will not see any changes. The result is the ability to provide an atomic transaction from the perspective of the downstream consumer within an environment in which data can be ingested from multiple disparate sources having different data formats.

Figure 3:
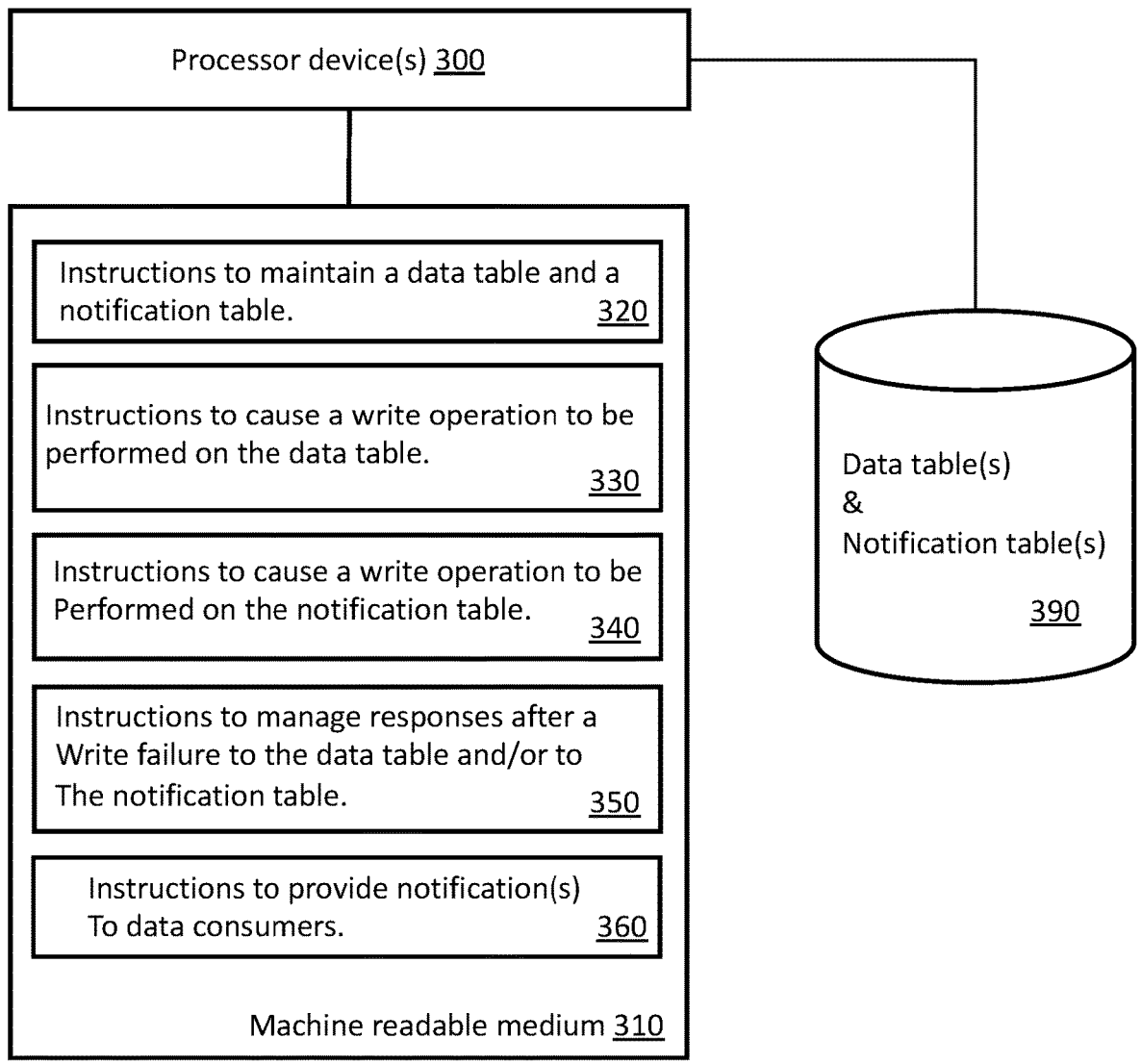
FIG. 3 is a block diagram of one embodiment of a processing resource and a machine readable medium encoded with example instructions to provide atomic transactions across multiple data sources.

FIG. 3 is a block diagram of one embodiment of a processing resource and a machine readable medium encoded with example instructions to provide atomic transactions across multiple data sources. Machine readable medium 310 is non-transitory and is alternatively referred to as a non-transitory machine readable medium 310. In some examples, the machine readable medium 310 may be accessed by processor device(s) 300. Processor device(s) 300 and machine readable medium 310 may be included in computing nodes within a larger computing architecture.

Machine readable medium 310 may be encoded with example instructions 320, 330, 340, 350 and 360. Instructions 320, 330, 340, 350 and 360, when executed by the processor device(s) 300, may implement various aspects of the techniques for providing atomic transactions as described herein.

In some embodiments, instructions 320 cause processor device(s) 300 to maintain the data table and the notification table. The data table(s) and notification table(s) can be maintained on storage device(s) 390. As discussed above, multiple data tables and notification tables can be maintained and utilized in parallel. In some embodiments, at least a portion of the data table and notification table functionality can be provided in association with open source components (e.g., KAFKA, SPARK). In other embodiments, instructions 320 can provide all of the table functionality. In some embodiments, the described functionality is provided within a multitenant on-demand services environment.

In some embodiments, instructions 330 cause processor device(s) 300 to cause a write operation to be performed on the data table(s). As discussed above, data to be ingested and consumed by downstream consumers (not illustrated in FIG. 3) is written to a data table as part of the atomic transaction. In some embodiments, the write to the data table happens before the write to the notification table. As described with respect to the flow diagram of FIG. 2, under certain conditions, the write to the data table may be retried. Thus, in some embodiments, feedback from the write operation may be utilized for subsequent instruction functionality.

In some embodiments, instructions 340 cause processor device(s) 300 to cause a write operation to the notification table. As discussed above, the write to the data table happens before (or concurrently with) the write to the notification table. As described with respect to the flow diagram of FIG. 2, the handling of the write to the notification table can be dependent upon the success or failure of the write operation to the data table.

In some embodiments, instructions 350 cause processor device(s) 300 to manage responses after a failure to write to the data table and/or a failure to write to the notification table. As discussed above, various responses can be initiated in response to a write failure. The example flow of FIG. 2 provides mechanisms for handling write failures to the data table and/or to the notification table. Alternative embodiments can also be supported.

In some embodiments, instructions 360 cause processor device(s) 300 to maintain the data table and the notification table. As discussed above, in response to successful writes to both the data table and the notification table an update or other indication is provided to downstream (in the data ingestion stream) consumers to allow the consumers to act on the newly available data. In some embodiments, consumers may be notified that the data table and/or the notification table have been updated. In other embodiments, the consumers may periodically check the notification table to determine whether any updates have occurred. A combination can also be supported.

Figure 4:
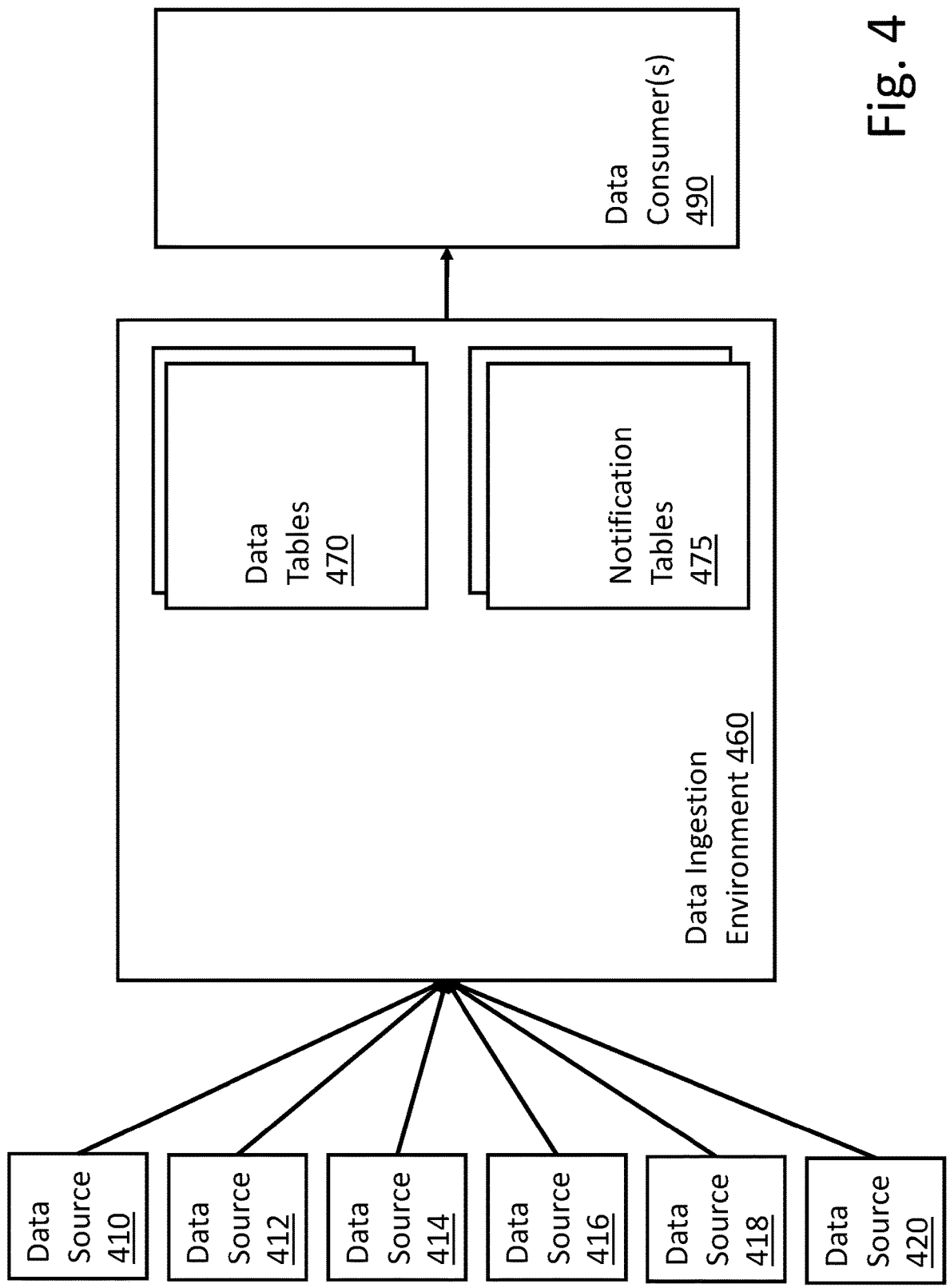
FIG. 4 is a block diagram of an example environment in which atomic transactions can be provided.

FIG. 4 is a block diagram of an example environment in which atomic transactions can be provided. The architecture of FIG. 4 provides a mechanism for gathering data from various sources and handling the ingestion of the data in the manner described above. Various use cases are provided herein; however, the architectures and mechanisms may be more broadly applicable than these use cases.

Any number of data sources (e.g., 410, 412, 414, 416, 418, 420) can be communicatively coupled with data ingestion environment 460 to provide various types of data. As discussed above, data ingestion environment 460 can be part of (or communicatively coupled with) a data lake that can absorb many types of raw data. The data can be, for example, user input from a graphical user interface (GUI), device movements (e.g., mouse, trackpad, eye tracking, gestures), browsing history, operating system information, security profiles, or any other type of data.

Data ingestion environment 460 can receive data from the various data sources and can write the data to one or more sets of data tables and notification tables as described herein. In some embodiments, for example, data ingestion environment 460 can maintain a data path for user input through a specific GUI (that may be accessed by multiple users on multiple devices), and a data table and a corresponding notification table can be utilized to write the user input as an atomic transaction to be consumed by one or more data consumers 490.

Data consumers 490 can be any type of device/entity that utilizes the data gathered by data ingestion environment 460. A data consumer can be, for example, a customer relationship management (CRM) platform that analyses and manages information and communications corresponding to various sales flows. A data consumer can be, for example, an artificial intelligence (AI) platform that predicts market conditions based on gathered data.

As mentioned above, one or more of the components discussed can be part of a multitenant on-demand services environment. In this example, various domains can be supported within the environment. For example, a sales domain may provide user input related to sales processes and an analytics domain may operate on data gathered from the sales domain and/or data from other domains. Thus, the atomic transactions described herein can be used to support complex data flows between many different types of data sources and many different types of data consumers.

Figure 5:
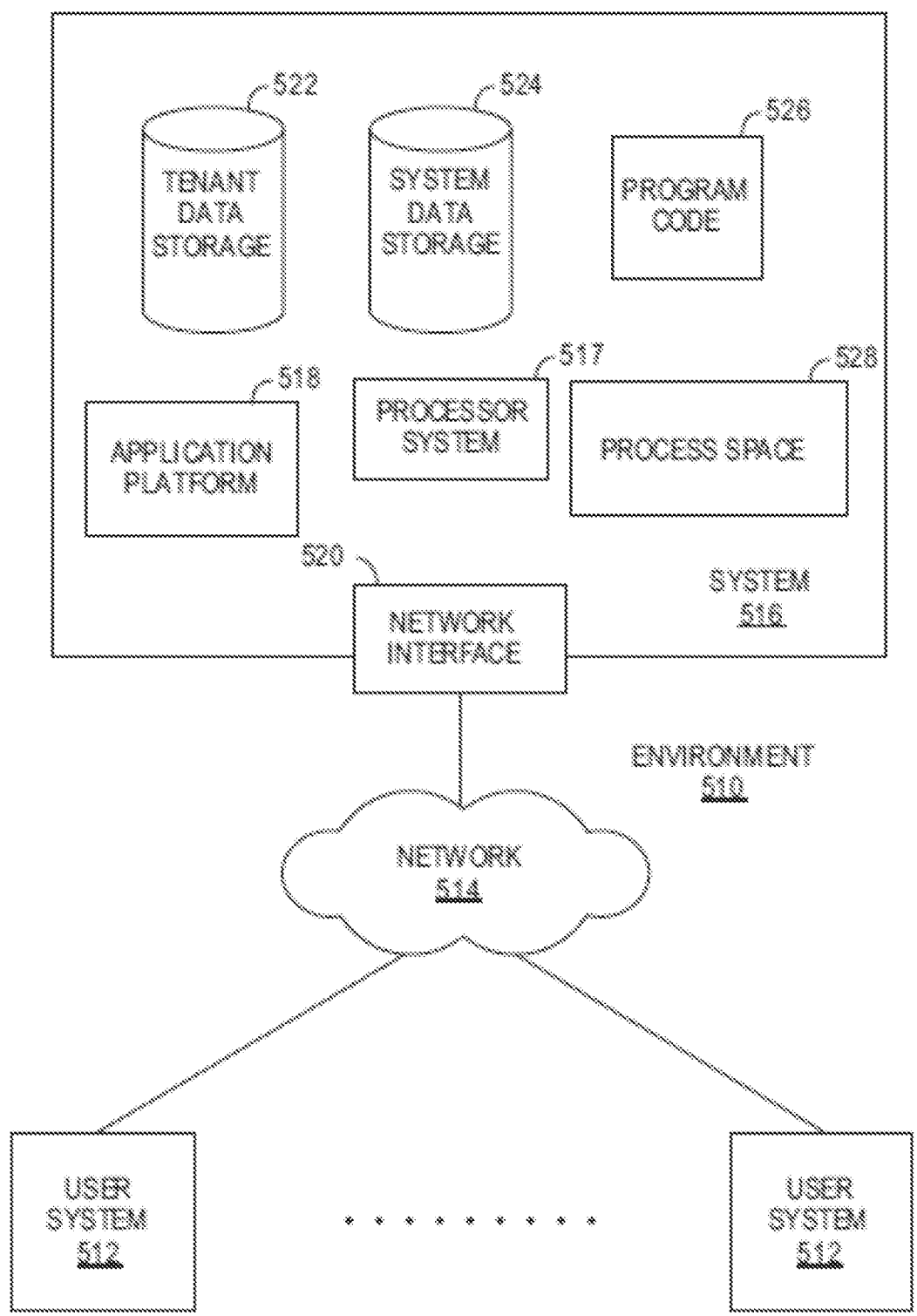
FIG. 5 illustrates a block diagram of an environment where an on-demand database service might function to utilize data ingested using atomic transactions as described herein.

FIG. 5 illustrates a block diagram of an environment where an on-demand database service might function to utilize data ingested using atomic transactions as described herein. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in herein FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Core series processor or the like. Similarly, system 516 (and additional instances of an MTS, where more than one is present) and all of their components might be operator configurable using application(s) including computer code to run using a central processing unit such as processor system 517, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
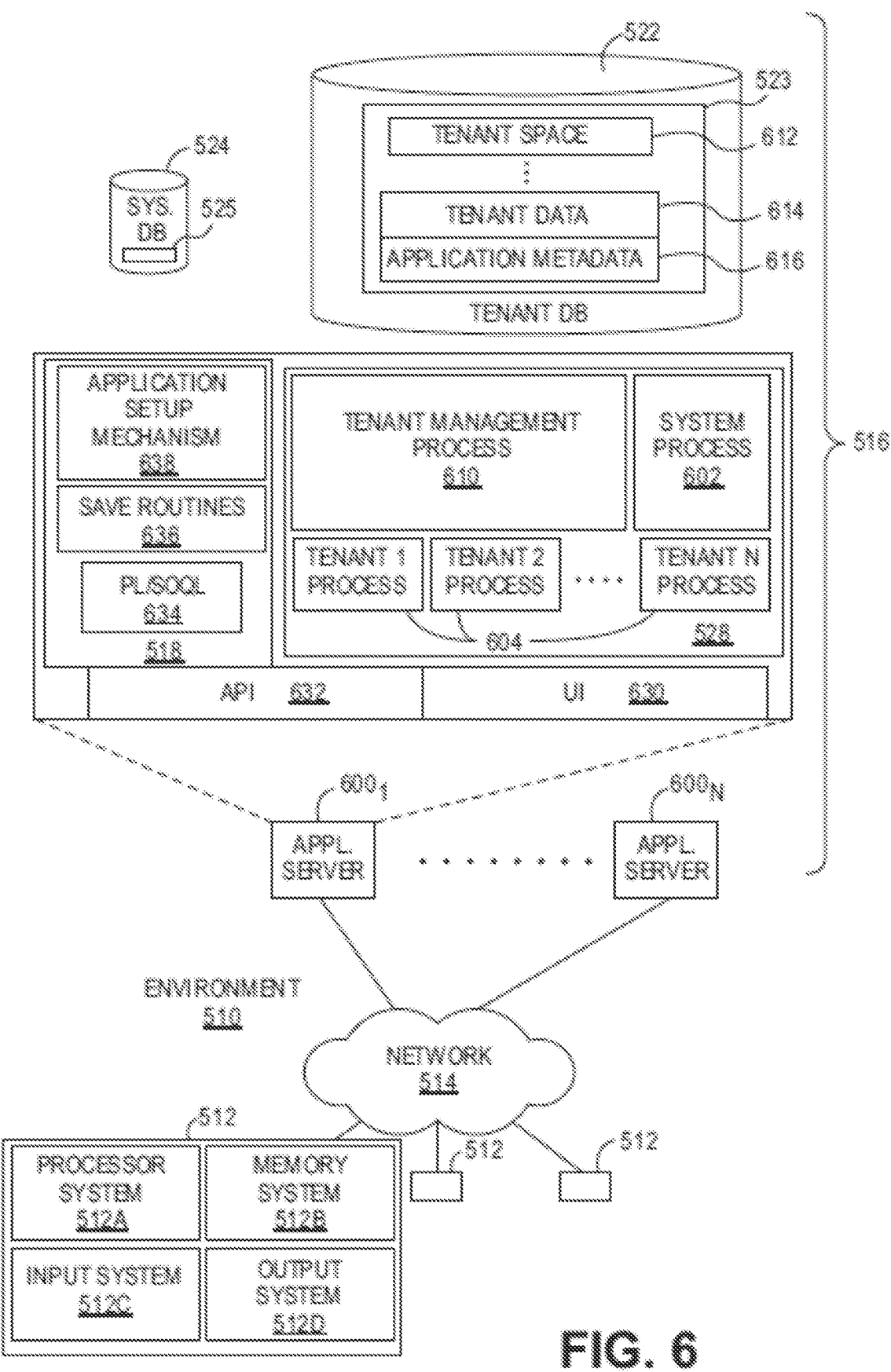
FIG. 6 illustrates a block diagram of an environment where an on-demand database service might function to utilize data ingested using atomic transactions as described herein.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 BIG-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for ingesting data through an atomic transaction, the method comprising:
obtaining raw data from multiple disparate sources via a communication interface to be consumed in an environment that does not support atomic write operations to data consumers, the environment having at least a data table and a notification table;
attempting to write via one or more processors an entry to the data table, the data table having an associated data table version, the data table entry comprising the data to be consumed;
attempting to write via the one or more processors a corresponding entry to the notification table in response to a successful write attempt to the data table, wherein the notification table entry comprises information about the corresponding data table entry;
modifying via the one or more processors the data table version in response to successful writes of both the data table entry and the notification table entry; and
notifying at least one data consumer via the communication interface that the data table version has been modified.

2. The method of claim 1 further comprising:
retrying the write to the data table a pre-selected number of times or until the write is successful; and
generating an indication of failure in response to the pre-selected number of unsuccessful write attempts.

3. The method of claim 1 further comprising rolling back the data table in response to successful writing of the data table entry and failure of the writing of the notification table entry.

4. The method of claim 1 wherein data to be consumed is received from multiple data sources having disparate native data formats.

5. The method of claim 4 further comprising storing the data in the data table entries in the native data format corresponding to an originating data source.

6. The method of claim 1 further comprising notifying one or more data consumers of a change in the data table version.

7. The method of claim 1 further comprising managing multiple data tables and multiple corresponding notification tables to receive data from multiple disparate data sources concurrently.

8. A non-transitory computer-readable medium having stored thereon instructions that, when executed by one or more processors, are configurable to cause the one or more processors to:
obtain raw data from multiple disparate sources to be consumed in an environment that does not support atomic write operations to data consumers, the environment having at least a data table and a notification table;
attempt to write an entry to the data table, the data table having an associated data table version, the data table entry comprising the data to be consumed;
attempt to write a corresponding entry to the notification table in response to a successful write attempt to the data table, wherein the notification table entry comprises information about the corresponding data table entry;
modify the data table version in response to successful writes of both the data table entry and the notification table entry; and
notify at least one data consumer that the data table version has been modified.

9. The non-transitory computer-readable medium of claim 8 further comprising instructions that, when executed by the one or more processors, are configurable to cause the one or more processors to:
retry the write to the data table a pre-selected number of times or until the write is successful; and
generate an indication of failure in response to the pre-selected number of unsuccessful write attempts.

10. The non-transitory computer-readable medium of claim 8 further comprising instructions that, when executed by the one or more processors, are configurable to cause the one or more processors to roll back the data table in response to successful writing of the data table entry and failure of the writing of the notification table entry.

11. The non-transitory computer-readable medium of claim 8 wherein data to be consumed is received from multiple data sources having disparate native data formats.

12. The non-transitory computer-readable medium of claim 11 further comprising instructions that, when executed by the one or more processors, are configurable to cause the one or more processors to store the data in the data table entries in the native data format corresponding to an originating data source.

13. The non-transitory computer-readable medium of claim 8 further comprising instructions that, when executed by the one or more processors, are configurable to cause the one or more processors to notify one or more data consumers of a change in the data table version.

14. The non-transitory computer-readable medium of claim 8 further comprising instructions that, when executed by the one or more processors, are configurable to cause the one or more processors to manage multiple data tables and multiple corresponding notification tables to receive data from multiple disparate data sources concurrently.

15. A system comprising:
one or more hardware processors; and
a memory system coupled with the one or more hardware processors and storing instructions, the instructions configured to be executed by the one or more hardware processors to obtain raw data from multiple disparate sources to be consumed in an environment that does not support atomic write operations to data consumers, the environment having at least a data table and a notification table, to attempt to write an entry to the data table, the data table having an associated data table version, the data table entry comprising the data to be consumed, to attempt to write a corresponding entry to the notification table in response to a successful write attempt to the data table, wherein the notification table entry comprises information about the corresponding data table entry, to modify the data table version in response to successful writes of both the data table entry and the notification table entry and to notify at least one data consumer that the data table version has been modified.

16. The system of claim 15 further comprising:
retrying the write to the data table a pre-selected number of times or until the write is successful; and
generating an indication of failure in response to the pre-selected number of unsuccessful write attempts.

17. The system of claim 15 further comprising rolling back the data table in response to successful writing of the data table entry and failure of the writing of the notification table entry.

18. The system of claim 15 wherein data to be consumed is received from multiple data sources having disparate native data formats.

19. The system of claim 18 further comprising storing the data in the data table entries in the native data format corresponding to an originating data source.

20. The system of claim 15 further comprising notifying one or more data consumers of a change in the data table version.

* * * * *